| United States Patent [19] | [11] 3,775,253 |
| --- | --- |
| Dieter et al. | [45] Nov. 27, 1973 |

[54] WATER-INSOLUBLE CARRIER-BOUND PROTEINS

[75] Inventors: Jaworek Dieter, Tutzing, Upper Bavaria; Gruber Wolfgang, Gartshausen; Bergmeyer Hans Ulrich, Tutzing, Upper Bavaria, all of Germany

[73] Assignee: Boehringer Mannheim GmbH, Mannheim, Germany

[22] Filed: June 15, 1972

[21] Appl. No.: 263,058

Related U.S. Application Data

[62] Division of Ser. No. 9,442, Feb. 6, 1970.

[30] Foreign Application Priority Data

Feb. 19, 1969 Germany.................. P 19 08 290.7

[52] U.S. Cl................ 195/63, 195/DIG. 11, 260/8, 260/112 R, 260/878 R
[51] Int. Cl............................ C07g 7/00, C07g 7/02
[58] Field of Search ....... 195/63–68, DIG. 11; 99/48

[56] References Cited
UNITED STATES PATENTS

| 3,536,587 | 10/1970 | Stahmann et al...................... 195/63 |
| 3,597,219 | 8/1971 | Wildi et al............................. 99/48 |

*Primary Examiner*—David M. Naff
*Attorney*—Peter Felfe

[57] ABSTRACT

Water insoluble biologically active proteins are bound on novel copolymers consisting of (a) acrylamide (b) ethylene-maleic acid or its anhydride and/or (c) maleic acid and/or its anhydride and (d) N,N'-methylene-bis-acrylamide or ethylene diacrylate in a weight ratio a:b:c:d of 3 : 0.5 – 1.5 : 0.05 – 4 : 0.075 – 0.9, the weight ratio $a : (b + c)$ being not more than 4, to provide compositions which are outstanding in their ability to yield up the bound protein, and with which precise substrate reactions can be carried out.

8 Claims, No Drawings

WATER-INSOLUBLE CARRIER-BOUND PROTEINS

This is a division, of application Ser. No. 9442 filed Feb. 6, 1970.

The present invention is concerned with water insoluble proteins bound to new polymeric carrier materials and is also concerned with the preparation of such bound protein materials and with the polymeric carrier materials and the production of the polymeric carrier materials.

In principle, a differentiation should be made between proteins which are inherently insoluble and those which are insoluble in bound form.

It is known that insoluble proteins can be formed by condensation, coupling and polymerization reactions with the protein itself. The proteins obtained in this manner are products of uncontrollable reactions; in other words, products with a definite constitution cannot be obtained. A large part of the protein becomes denatured by the severe reaction conditions of the polymerization and of the coupling with, for example, bisdiazo compounds and by the action of the components used for the condensation, such as formaldehyde, ethyl chloroformate and the like, and thus is biologically inactivated. For most fields of use of insoluble proteins, such denatured material is useless.

As insoluble, biologically-active proteins, only those proteins which are fixed on carrier materials are of importance since they are materials of definite constitution which can generally be used universally as enzymes, inhibitors, antigens or anti-bodies or as proteins.

The binding of the proteins to the carrier materials can take place in a heteropolar or homopolar manner. The heteropolar bound proteins are of lesser interest since the proteins can be lost by elution from the carrier materials, in amounts depending upon the ion concentration and pH value of solutions with which they are contacted.

The following methods have been used for fixing proteins to insoluble carriers by means of reactive groups:

1. Reaction of cellulose with p-nitrobenzyl chloride to give the corresponding cellulose derivative, which is reduced to the corresponding amino derivative and diazotised and then coupled with proteins;
2. The reactive groups described in (1) are replaced by $m$-aminobenzyloxymethyl radicals;
3. Polyamino-polystyrene, which is a completely synthetic carrier, is reacted with proteins;
4. d,1-$p$-aminophenyl-alanine, d,1-leucine and similar amino acids are polycondensed to give a synthetic carrier, the diazotised amino groups of which are coupled with proteins;
5. By means of methods known from peptide chemistry, carboxymethyl-cellulose is reacted with proteins using dicyclohexyl carbodiimide as condensation agent;
6. From carboxymethyl-cellulose there is produced, via. the hydrazide, the corresponding azide which is reacted with proteins;
7. Proteins have been bound with bromoacetyl-cellulose;
8. From isothiocyanate derivatives of the dextran gel known under the Registered Trade Mark "Sephadex" and cellulose, there have been produced water-insoluble enzyme compounds with proteins;
9. Under the conditions of acrylamide polymerization, proteins can be fixed in readily swellable material. The enzyme is thereby bound radically on the chains;
10. Furthermore, proteins have also been bound to ethylene-maleic acid anhydride (EMA);
11. Proteins have also been bound to styrene-maleic anhydride copolymers.

The previously known methods are not satisfactory and are not of general applicability for proteins. Thus, less than 50% of protein is bound by methods 1, 2 and 4, and a greater part of the protein loses its biological activity. Method 3 has proven to be even less suitable.

Method 5 can only be carried out in a non-aqueous medium and, therefore, can only be used for some antibody and low molecular weight inhibitors.

According to method 6, only about 10 percent of the protein used is bound, only 10 – 43% of which retains its enzymatic activity.

Method 7 gives a high yield of bound protein (80 – 90%) but for many proteins, the reaction conditions used result in a loss of biological activity.

In the case of method 8, only a very small percentage of the protein used is actively bound to the gel.

According to method 9, only 18 – 20% of the protein used is bound, only a few per cent of which can evolve an activity against substrates. High molecular weight substrates, such as hemoglobin, only reacted to an extent of 1 – 2%.

At the moment, method 10 gives the most satisfactory results. It is used for antigens, inhibitors and enzymes. The binding reaction takes place under mild conditions in an aqueous medium; about 50 – 60% of the protein can be fixed under optimum conditions.

However, the starting material used is very non-uniform: it contains lower molecular weight fractions, some of which are soluble, and higher molecular weight fractions, which are insoluble, which cannot be separated by sieving or by other means. Therefore, only up to 60% of the protein is bound to the insoluble carrier, the remainder being lost as soluble material. However, the bound protein is still not satisfactory.

In the binding of the protein to the carrier (EMA), the protein fulfills the function of a comonomer; it can be bound not only at one position but also at several positions, i.e. it may be cross-linked. Depending upon the protein concentration, more or less readily swellable protein-carrier materials are obtained. The protein is thereby present in a network in covalent bound form so that diffusion plays an important part in the case of the use of this carrier and it is only partially accessible to a substrate. This disadvantage is not even overcome by the addition of cross-linking agents, such as hexamethylene-diamine or the like. Therefore, only about 50% of the bound protein can be reached by low molecular weight substrates, so that the total activity thereof does not amount to more than 30%. In the case of high molecular weight substrates, an activity of only 10% or less has been found.

An additional disadvantage of this material is that it is of varyingly difficult filterability, i.e. it can, for example, be flocculent, which differs from one protein to another, and is also dependent upon the protein concentration. Thus, there is no assurance that the bound protein produced therewith can be packed into columns.

Styrene-maleic anhydride polymers used according to method 11 can be used for the removal of proteins, for example, in the purification of drinking water and the like. These carriers have, similarly to the polyamino-styrenes, a decidedly lyophilic character. Proteins cannot be bound to their structure without loss of activity and, when such polymers are bound with proteins, they cannot be lyophilized.

The functional groups of the known carriers which are not bound to protein carry, in the appropriate pH ranges, positively charged $NH_2$-groups in the case of methods 1, 2, 3 and 4 and negatively charged -COO- groups in the case of methods 6, 8 and 10. In the case of method 10, -COO- groups are additionally formed by the bonding of protein to the cyclic anhydride groups of the polymer. This polyvalent character of the protein carriers causes adsorption of the matrix, in a manner similar to ion exchangers, increased inactivation or denaturing of the protein structure and displacement of the pH optima in the case of bound enzymes.

There is, therefore, a great interest in the provision of a suitable carrier for water-insoluble proteins, as well as of water-insoluble proteins bound on a carrier and of a process for the preparation thereof.

The present invention substantially overcomes the deficiencies of prior carriers and/or techniques for binding proteins to carrier materials by providing novel copolymers eminently utilizable as protein carriers, methods for making same, a technique for binding proteins to such novel carriers, and the resulting protein/carrier combination as such.

The copolymers according to the present invention essentially consist of (a) acrylamide, together with (b) ethylene-maleic acid or its anhydride and/or (c) maleic acid, and also (d) N,N'-methylene-bis-acrylamide or ethylene diacrylate in a weight ratio a:b:c:d of $3 : 0.5 - 1.5 : 0.05 - 4 : 0.075 - 0.9$, the weight ratio $a : (b + c)$ being not more 4.

The residue of the dicarboxylic acid in the copolymer, i.e. that derived from component (b) and/or (c), is preferably present in the form of the anhydride. The weight ratio of acrylamide to component (d), i.e. N,N'-methylene-bis-acrylamide and/or ethylene diacrylate, is preferably 3 to not more than 0.45.

In the following, the new copolymers according to the present invention, the production thereof and their use, are described in more detail.

Acrylamide, N,N'-methyl-bis-acrylamide and/or ethylene diacrylate, as well as maleic acid or ethylene-maleic acid or the corresponding anhydrides thereof are polymerized in the presence of free-radical catalysts and free radical accelerators in the above-given ratios and with the use of known methods. Although it is possible to carry out such a polymerization using maleic acid or maleic anhydride in wide ranges of concentration, we have found that copolymers suitable for binding proteins according to the present invention are only obtained when using the weight ratios given above.

In the production of the copolymer, the ratio of acrylamide to maleic acid or ethylene maleic acid or to the corresponding anhydrides can be varied within the given ranges without substantially affecting the necessary amount of cross-linking agent (d). Thus, acrylamide can be polymerized with maleic acid or its anhydride in a ratio by weight of 3 : 0.1 to 4 without the weight ratio of acrylamide to cross-linking agent hereby being substantially influenced. However, as indicated above, in the case of the use of ethylene-maleic acid or of its anhydride as comonomer, the limits are narrower. In this case, the content of cross-linking agent governs the pore size and strength, as well as the bonding of the ethylene-maleic acid in the gel.

For use for fixing of proteins, especially good copolymers have been obtained with the use of acrylamide and maleic acid or ethylene-maleic acid or the corresponding anhydrides in a ratio by weight of 3 : 0.5 to 1.0. In the case of increasing the concentration of the dicarboxylic acid to 1.5, the copolymer becomes more brittle and less swellable but still exhibits good properties as a carrier for proteins. In the case of a ratio of acrylamide to cross-linking agent, i.e. N,N'-methylene-bis-acrylamide or ethylene diacrylate, of 3 : 0.075 to 0.450, there are obtained gel-like polymers with especially good properties. A ratio of 3 : 0.075 represents the lower limit in which the maleic acid or ethylene-maleic acid can still be satisfactorily incorporated into the copolymer.

For the fixing of proteins in aqueous media, there have also proved to be very useful copolymers with cross-linking agents in amounts corresponding to a weight ratio of acrylamide to cross-linking agent of more than 3 : 0.45, for example of 3 : 0.6 - 0.9. However, when using protein bound to such carriers at salt concentrations of more than 0.05M, the relatively closely cross-linked gels hereby obtained have proved to be disadvantageous for the protein structure.

The production of the copolymers according to the present invention can be carried out, for example, in aqueous solution and preferably in an inert atmosphere. Examples of free radical catalysts or free radical accelerators which can be used include propionic acid nitrile and ammonium peroxydisulphate. The polymerization can be carried out at ambient temperature or also at higher temperatures of up to 100° C., as well as at reduced temperatures. The period of time of the polymerization depends upon the selected polymerization temperature, the selected accelerators or catalysts and on the composition by weight of the reaction mixture. Usually, it is between about 5 minutes and several hours.

After solidification, for the achievement of a particle size which is especially suitable for handling, the polymerized material is forced through a sieve with the desired mesh size, then washed with water and lyophilized.

For the fixing of the protein, it is necessary that the dicarboxylic acid residues in the polymer be present in the form of the anhydride. Therefore, before the bonding of the protein, all acid groups present must again be converted into cyclic anhydride groups. This can be effected, for example, by heating the lyophilized copolymer in a vacuum to a temperature of about 80° – 120° C. or at atmospheric pressure to a temperature of about 160° – 220° C., preferably of 180° – 200° C.

The copolymers according to the present invention are, depending upon the concentration of cross-linking agent, water white to milky cloudy substances with a rubber-like to brittle consistency.

The copolymers can easily be granulated, for example, by forcing them through a metal sieve. Copolymers which are especially suitable for the purpose of protein bonding are those with particle sizes of about 0.35 – 0.8 mm. Upon the addition of water, the granulate swells. The strength of the swelling is dependent upon the content of cross-linking agent. The more closely the copolymers according to the present invention are cross-linked, the less swellable they are.

The de-swelling can be carried out with the use of, for example, alcohol or, more simply, by lyophilization.

In some respects, the particles of the copolymer according to the present invention are similar to those of the known polyacrylamide molecular sieves. In the case of treatment with buffer solutions, a shrinkage takes place which is dependent upon the number of carboxylic acid groups present, similarly to ion exchangers based on dextran or polyacrylamide.

When the carboxylic acid groups are converted into cyclic anhydride groups by heating to about 200° C., a slight yellow coloration frequently occurs. If heating is continued for a comparatively long period of time, then the color deepens from yellow to brown and, at the same time, the binding capacity decreases markedly. Therefore, heating for a comparatively long period of time at the necessary temperature under atmospheric pressure is to be avoided if possible.

The porosity and hardness of the copolymer according to the present invention in the swollen gel state is, in the first place, determined by the content of cross-linking agent. The material exhibits molecular sieve properties, similar to those of polyacrylamide gels, the exclusion limits of which can be determined, as desired, by the content of cross-linking agent. In the swollen state, the copolymer according to the present invention can easily be filtered or centrifuged and has ideal properties for column packing. When swollen in water or in a buffer solution and then de-swollen by lyophilization, the gel-like copolymer is of unlimited life.

The copolymer according to the present invention permits the binding of protein under mild conditions because it is hydrophilic and extremely swellable and the protein bonding only takes place by solvolysis of the cyclic anhydride groups. The protein structure is thus maintained after the bonding of the protein has taken place and activity yields of up to 100% and even more, due to a potentiation of the activity, can be obtained. Unbound protein can be recovered without loss of activity. In the case of the binding, the protein does not perform a cross-linking function in the matrix but rather the carrier-bound enzymes, which can be called "enzyme gels," are completely uniform and do not exhibit a differing strength dependent upon the concentration of the protein.

Due to its precise degree of cross-linking, the molecular sieve properties of the copolymer can be so adjusted that only proteins in the desired range can penetrate into it. Thus, it is possible so to cross-link the copolymer for certain proteins that the protein binding can only take place on the surface of the gel particles or, if desired, can also take place in the totality of the gel. The polymerization parameters can be varied according to the effective molecule radii, steric effects and charge distributions.

The copolymers according to the present invention possess adsorption properties such that, in water or weak buffer solutions (up to about 0.01M), the protein is completely fixed on the carrier. Up to 85% of the protein is hereby covalently bound and the remainder heteropolarly bound. In the case of the use of the copolymers according to the present invention without previous cyclization of the acid groups, the protein bonding only takes place adsorptively. It has been found that, under these conditions, the protein can again be eluted from the carrier with salt solutions, without loss of activity.

The protein-binding capacity of the copolymer according to the present invention is dependent upon the number of anhydride groups present and upon the pore size. In the case of a more closely cross-linked product, the binding capacity is lower than in the case of a less closely cross-linked product with the same number of anhydride groups present since the protein molecule, in the case of closer cross-linking, cannot react all of the available groups capable of bonding.

If, in the copolymer according to the present invention, too many charges are present which cannot be occupied by protein by covalent bonding, then generally there takes place a displacement of the pH optima in the case of the bound enzymes. Correspondingly, it has been observed, in the case of known carrier-bound enzymes, that, in the case of negatively-charged carried materials, a displacement of two pH units occurred; for example, in the case of trypsin bound to ethylene-maleic acid anhydride, from 7.8 to 10.0 and, in the case of positively-charged carriers, a displacement into the acid region took place. In the case of the copolymers according to the present invention, it is possible to use the groups capable of bonding to a maximum extent so that carrier-bound proteins can be obtained which show no displacement of the pH value optimum.

An especially interesting property of the water-insoluble proteins bound on carriers according to the present invention is that, under certain circumstances, lower Michaelis constants are obtained than in the case of the unbound enzyme. Thus, for example, we have found that the activity of trypsin bound according to the present invention towards N-benzoyl-1-arginine-p-nitranilide is increased in comparison with the unbound enzyme.

The carrier-bound enzymes according to the present invention exhibit a plethora of highly desirable properties and can be used for a large number of different fields of application. Thus, they make it possible to carry out substrate reactions with a greater degree of precision than heretofore since the enzyme can again be removed from an incubation batch at any desired point of time. If the reaction is still not quantitative, then the same enzyme can be used again. In the case of proteases, the protein to be split can be isolated at any desired stage of hydrolysis. The fission reaction can thus be followed directly. The enzymatically-active protein must no longer, as was previously the case, be precipitated after the substrate reaction — in this case the substrate reaction product was frequently changed — but can be removed by simple filtering or decanting off or the like.

Substrate reactions can also be carried out in columns with carrier-bound enzymatically-active proteins of this type. When the carrier enzyme according to the present invention is packed into a cage-like vessel, it can be placed in an incubation reaction batch in the manner similar to a tea egg and removed therefrom at any time.

With the use of proteolytically-active, carrier-bound enzymes, inhibitors can be isolated in a simple manner. The stability of the proteases is thereby substantially increased by the binding to the carrier material since the proteases no longer are subjected to an autolytic reaction.

With carrier-bound protease inhibitors according to the present invention, proteases can be isolated simply, quickly and quite specifically. With the use thereof, it is also possible to remove proteases from protease-containing solutions of proteins and thus to stabilize them.

By means of antigens and antibodies fixed on carriers according to the present invention, there can be carried out a simple isolation of antigens and anti-bodies. With carrier-bound enzyme anti-bodies of this type, an enzyme isolation can be carried out especially simply and effectively.

The bound proteins according to the present invention can be used repeatedly and quite generally and some of them show no loss of activity even after having been used for a long period of time.

Because of the molecular sieve properties of the copolymers according to the present invention, the carrier-bound proteins can also be used for the separation of substrates.

The copolymers according to the present invention are, with regard to their suitability for the fixing of biologically active proteins, much superior to previously known carrier materials used for the same purpose, as is shown by the results summarized in the following Table I:

homopolar-bound enzyme is very high, whereas there is practically no adsorptive-bound enzyme. If, on the other hand, there is used a lower buffer concentration and the carrier and enzyme are mixed together quickly, then the yield of bound protein is admittedly higher but a considerable proportion of the protein which has got on to the carrier can be eluted again with high buffer concentrations which, therefore, cannot have been homopolar bound. If, for example, as mentioned above, there is used a high buffer concentration and slow addition of the carrier, then about 80% of the enzyme present goes on to the carrier and can no longer be eluted therefrom. The enzyme is thus substantially completely homopolarly bound and its activity is solely determined by the accessibility for the substrate. In the second case, however, in the case of lower buffer concentrations and rapid addition, admittedly 100% of the protein present is absorbed on the carrier but up to 35% of this can again be eluted with high salt or buffer concentrations and this amount is, therefore, not homopolarly bound.

The following Examples are given for the purpose of illustrating the present invention:

TABLE I

| Carrier material | Uniformity of the material | Carrier: protein ratio | Yield of bound protein (in percent) | Activity [4] of low mol. wt. substrate (in percent) | Yield, percent activity of starting material |
|---|---|---|---|---|---|
| PAAD [1] | Uniform | 20:1 | 15-18 | 90 [5] | 10-13. |
| CMC—hydrazide (enzyme) [2] | do | 10:0.5-10:1 | 25-30 | Up to 40 [6] | Up to 14. |
| EMA [3] | Nonuniform | 5:1 | 40-45 | 60-70 [7] | Up to 30. |
| According [9] to the invention | Uniform | As desired 1:2 | Up to 80 | Up to 100 [8] | Up to 80. |

[1] Polyacrylamide.
[2] Carboxymethyl cellulose hydrazide.
[3] Ethylene-maleic acid anhydride.
[4] Trypsin activity.
[5] All low molecular weight amino acid substrates.
[6] Chymotrypsin activity.
[7] Amino acid esters protected on the nitrogen.
[8] N-benzoyl-l-arginine-p-nitroanilide.
[9] The specific copolymer was.

The superiority of the carrier-bound proteins according to the present invention lies not only in their superior yields and activity but also in the substantially more dependable and definable ratio of the carrier to the protein.

The copolymers according to the present invention can be used for the fixing of proteins of very different molecular sizes and properties since the properties of the carrier material can be adjusted without difficulty, according to the requirements of the protein to be bound. When, for example, the protein has a particularly large molecule, then, by reduction of the degree of cross-linking to a large extent, a penetration of the protein into the matrix and binding therein can be accomplished. In the case of protein molecules which are so large that, even in the case of a cross-linking to the smallest possible extent, their penetration into the matrix is substantially impaired, it is also possible to carry out a fixing of the protein only on the surface of the particles, the copolymer in this case being preferably of such a fine particle size that a very large surface area is obtained so that the fixing of the protein, which then only takes place on the surface, results in a completely sufficient degree of fixing.

The ratio of homopolar to adsorptive or heteropolar enzymes bound on the carrier can be influenced by the nature of the production of the bonding between the protein and the carrier. If, for example, the protein is present in a relatively high buffer concentration and slowly added to the non-swollen gel, then the yield of

PRODUCTION OF THE COPOLYMERS OF THIS INVENTION

EXAMPLE 1

3 g. acrylamide and 0.3 g. N,N'-methylene-bis-acrylamide were suspended, together with 1 g. ethylene-maleic acid anhydride, in 23 ml. 0.05M phosphate buffer of pH 7.6 and, with vigorous stirring in an atmosphere of nitrogen and at ambient temperature, mixed with 1 ml. of 5% propionic acid nitrile and 1 ml. 5% ammonium peroxydisulphate. After 10 – 15 minutes, the mass solidified to a gel-like block. This was left to stand for 60 minutes at ambient temperatures and then forced through a metal sieve with an internal mesh size of 0.5 mm. The granulate obtained was washed with about 5 liters of distilled water at this stage (the wet weight amounted to about 38.2g.)

The swollen copolymer thus obtained was lyophilized in order to de-swell it. In a dry state, the weight of the copolymer amounted to 5.4 g.

For cyclization to the acid anhydride, the material was subsequently heated for 1.5–2 hours at 200° C. in a drying cabinet.

EXAMPLE 2

3 g. acrylamide, 0.075 ethylene diacrylate and 1 g. maleic acid were copolymerized in the manner described in Example 1. The period of polymerization was 15 hours. Further working up was carried out in the manner described in Example 1. The yields of lyophilized product was 2.3 g. After cyclization, the weight of the product was 2.05 g.

EXAMPLE 3

3 g. acrylamide, 0.3 g. N,N'-methylene-bis-acrylamide and 1 g. maleic acid were copolymerized in the manner described in Example 1. The period of polymerization was 15 hours. Further working up was also carried out in manner described in Example 1. The yield of lyophilized material was 2.67 g. After cyclization, the weight of the product was 2.45 g.

EXAMPLE 4

3 g. acrylamide, 0.6 g. N,N'-methylene-bis-acrylamide and 1 g. maleic acid were copolymerized in the manner described in Example 1. The period of polymerization was 5 hours. Further working up was also carried out in the manner described in Example 1. The yield of lyophilized material was 2.8 g. After cyclization, there was obtained 2.6 g. of end product.

EXAMPLE 5

3 g. acrylamide, 0.3 g. N,N'-methylene-bis-acrylamide and 0.1 g. maleic acid were copolymerized for 5 hours in the manner described in Example 1. Further working up was also carried out in the manner described in Example 1. The wet weight of the swollen product was 53.5 g. After lyophilization the dry weight of the product was 4.8 g. and cyclization gave a yield of end product of 3.1 g.

PREPARATION OF CARRIER-BOUND PROTEINS

EXAMPLE 6

There was used a cyclized copolymer of 3 g. acrylamide 0.15 g. N,N'-methylene-bis-acrylamide and 1 g. maleic acid as carrier. 100 mg. trypsin were stirred with 1 g. carrier in 15 ml. ice-cold water (pH 5.2) and allowed to react for 15 hours at 4° C. in a cool room. The product was subsequently filled into a column.

The heteropolar bound protein was eluted with 65 ml. wash water. Thereafter, with the use of 0.2M phosphate buffer (pH 7.8), no further protein could be eluted.

Heteropolar-bound protein : 31%
at pH 7.0, 8.5, 10 : 20%
Residual activity, referred to non-bound trypsin: 50%.

EXAMPLE 7

The product of Example 5 was used as carrier. The carrier was reacted with 100 mg. trypsin in the manner described in Example 6.
Non-bound protein : 30%
Activity of the bound protein
before treatment with 0.2M buffer : 100%
after treatment with 0.2M buffer : 50%

EXAMPLE 8

There was used the same carrier as was employed in Example 6. 100 mg. carrier and 200 mg. trypsin were allowed to react in the manner described in Example 6.
Non-bound protein : 50%
Activity of the bound protein
before treatment with 0.2M. buffer : 100%
after treatment with 0.2M buffer : 48%

EXAMPLE 9

As carrier, there was used the product of Example 3. 100 mg. calf serum albumin were allowed to react with 1 g. of the carrier in the manner described in Example 6.
Non-bound protein : 32%
Protein cannot be eluted from the carrier either with 0.2M phosphate buffer (pH 7.8) or with 0.2M glycine buffer (pH 1.8). The yield of homopolar-bound protein was 68%, referred to the amount of protein used, and 100% referred to the bound protein.

In the case of the use of human serum albumin instead of calf serum albumin, the same result was obtained.

EXAMPLE 10

The product of Example 3 was used as carrier. 1 g. of carrier was added portionwise, within a period of 60 minutes, to 200 mg. trypsin dissolved in 18 ml. 0.1 M. phosphate buffer (pH 7.8) and allowed to react for 18 hours at 4° C.
Non-bound protein : 50%
Activity of the bound protein, referred to the activity initially used : 40%
No protein and no activity can be eluted from the carrier with 0.2M, 0.33M or 0.5M phosphate buffers.

What is claimed is:

1. Water-insoluble carrier-bound proteins, comprising a protein bound to a polymer consisting of (a) acrylamide; together with at least one member selected from the group consisting of (b) and (c) wherein (b) is a copolymer of ethylene-maleic acid or its anhydride and (c) is maleic acid or its anhydride; and, in addition, (d) N,N'-methylene-bis-acrylamide or ethylene diacrylate; in a weight ratio $a:b:c:d$ of $3 : 0.5 - 1.5 : 0.05 - 4 : 0.075 - 0.9$, the weight ratio $a : (b+c)$ being not more than 4, wherein said protein is directly bound to said polymer through acid anhydride groups of the polymer.

2. Carrier-bound proteins as claimed in claim 1 wherein the protein is an enzyme, inhibitor, antigen or antibody.

3. An enzyme catalyst comprising a catalytic enzyme bound to a polymer as claimed in claim 1.

4. Carrier-bound protein as claimed in claim 1 wherein said polymer consists of (1) acrylamide, (2) a copolymer of ethylene-maleic acid or its anhydride, and (3) N,N'-methylene-bis-acrylamide or ethylene diacrylate, in a weight ratio $(1) : (2) : (3)$ of $3 : 0.5 - 1.5 : 0.075 - 0.9$.

5. Carrier -bound protein as claimed in claim 1 wherein said polymer consists of (1) acrylamide, (2) maleic acid or its anhydride and (3) N,N'-methylene-bis-acrylamide or ethylene diacrylate in a weight ratio $(1) : (2) : (3)$ of $3 : 0.05 - 4 : 0.075 - 0.9$.

6. Carrier-bound protein as claimed in claim 1 wherein the weight ratio $a : d$ is 3 to not more than 0.45.

7. Carrier-bound protein as claimed in claim 1 wherein the weight ratio $a : d$ is $3 : 0.6$ to $3 : 0.9$.

8. Carrier-bound protein as claimed in claim 1 wherein the weight ratio $a : (b+c)$ is $3 : 0.5$ to $3 : 1.0$.

* * * * *